Oct. 27, 1953  J. E. NEELY  2,656,991
REEL STRUCTURE FOR SHORTENING WIRE CORDS
Filed Feb. 23, 1951  3 Sheets-Sheet 1

INVENTOR.
JOHN E. NEELY
BY
ATT.

Oct. 27, 1953  J. E. NEELY  2,656,991
REEL STRUCTURE FOR SHORTENING WIRE CORDS
Filed Feb. 23, 1951  3 Sheets-Sheet 2

INVENTOR.
JOHN E. NEELY
BY
ATT.

Oct. 27, 1953  J. E. NEELY  2,656,991
REEL STRUCTURE FOR SHORTENING WIRE CORDS
Filed Feb. 23, 1951  3 Sheets-Sheet 3

INVENTOR.
JOHN E. NEELY
BY
ATT.

Patented Oct. 27, 1953

2,656,991

UNITED STATES PATENT OFFICE 2,656,991

REEL STRUCTURE FOR SHORTENING WIRE CORDS

John E. Neely, Cleveland, Ohio

Application February 23, 1951, Serial No. 212,238

3 Claims. (Cl. 242—77)

This invention relates to wire reel structures and has for its principal object the provision of a simple, inexpensive reel structure for shortening electric wire cords, the reel structure including a wire reel constructed for winding thereon the middle portion of a wire cord when electrically connecting a fixture with an outlet box of a circuit, and a container-like member encompassing the reel for protecting the wire cord wound thereon.

Another object of the invention is the provision of a reel structure for shortening electric wire cords, the reel structure including a wire reel consisting of a spool-like member having at one side inlet and outlet means to permit starting and stopping of the winding of a wire cord on the spool between the opposite ends of such cord, and a container-like member encompassing the reel for protecting the portion of the cord wound on the spool-like member.

A further object of the invention is the provision of a reel structure for shortening electric wire cords, the reel structure including a wire reel embodying a spool-like member having its side members constructed as radial, laterally-spaced, guide arms to properly hold an electric cord on such member and permit starting and stopping of the winding of a wire cord on the member at any point between the opposite ends of such cord and a cylindrical, cup-shaped housing encompassing the wire reel and held in axial alignment therewith by the radial, spaced, guide arms of the spool-like member.

Still another object of the invention is the provision of a reel structure for shortening electric wire cords, the structure including a wire reel embodying a spool-like member having its side members constructed as radial, spaced guide arms to guide an electric wire cord having its middle portion wound on the spool-like member, with the guide arms at opposite sides of the spool-like member arranged in offset relation with respect to each other and provided with bores permitting unimpeded mounting of the wire reel by attachment means extended through the bores.

A still further object of the invention is the provision of a reel structure for shortening electric wire cords, the structure including a wire reel embodying a spool-like member having its side portions formed by L-shaped arms alternately extended from the opposite side portions of the member in such a fashion that the outer flanges of the L-shaped arms extend in spaced relation above the body of the member and prevent undesired unwinding of a portion of an electric wire cord wound on the wire reel.

Still another object of the invention is the provision of a reel structure for shortening electric wire cords, the reel structure forming a part of the plug end of an electric wire cord and including a spool-like member having mounted in its body portion plug members electrically connected with the wires of the electric wire cord and having its side portions formed by L-shaped arms alternately extended from the opposite side portions of the member in such a fashion that outer flanges of the L-shaped arms extend in spaced relation above the body of the member to prevent undesired mounting of a portion of the electric wire cord wound on the reel structure.

With the above and other incidental objects in view, the invention has other marked improvements and superiorities, which radically distinguish same from presently known structures. These improvements and superior characteristics, embodying certain novel features of construction are clearly set forth in the appended claims and the preferred embodiments hereinafter shown with reference to the accompanying drawings forming part of the specification.

Figure 1:
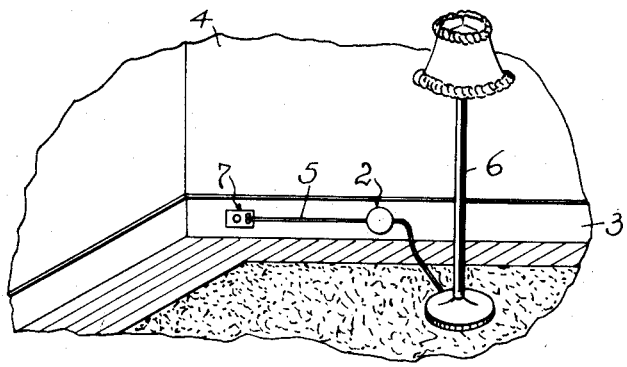
Fig. 1 shows in a perspective view use of a reel structure according to the invention in effecting a shortening of the length of an electric wire cord which connects a floor lamp with a baseboard outlet of a house circuit.
Figures 2, 4:
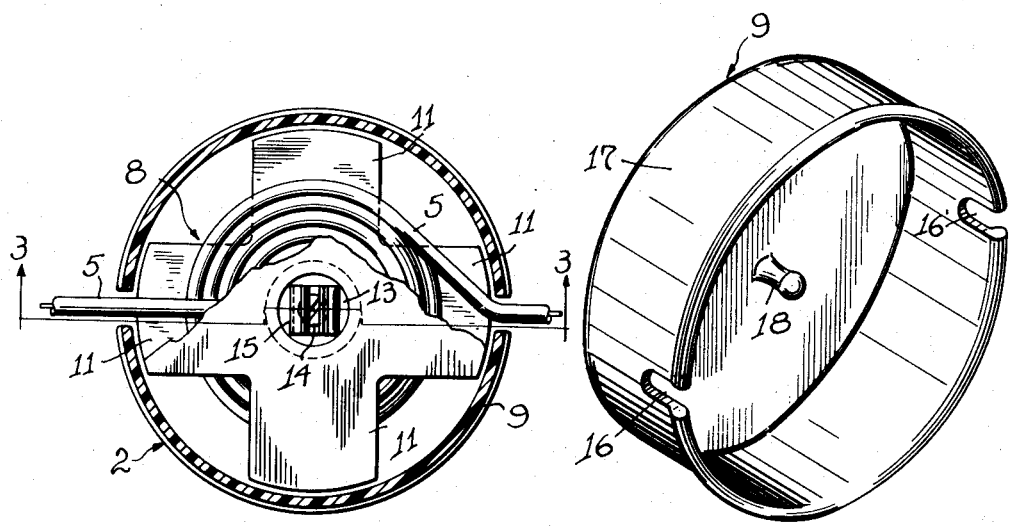
Fig. 2 is a sectional view through the reel structure shown in Fig. 1, the section being taken on line 2—2 of Fig. 3.
Fig. 4 is a perspective view of the cover member for the wire reel or spool of the reel structure shown in Figs. 1 through 3.
Figure 3:
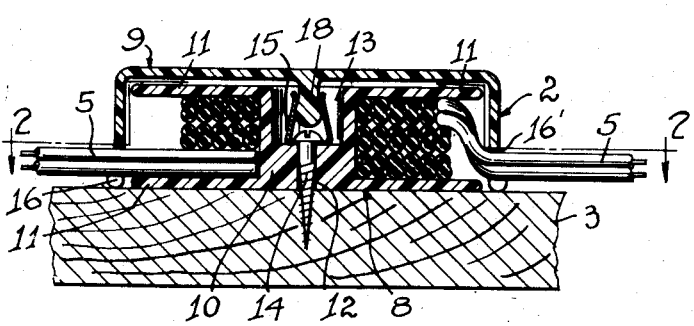
Fig. 3 is a sectional view taken on line 3—3 of Fig. 2.

Referring now more particularly to the form of the invention shown in Figs. 1 through 4 of the drawings, reference numeral 2 denotes a reel structure mounted on the baseboard 3 of a wall 4, which reel structure has wound thereon a portion of an electric wire cord 5 electrically connecting floor lamp 6 with an outlet plug switch 7. The reel structure embodies a winding spool 8 and a cover member 9 removably secured thereto as will be described later. Winding spool 8 is preferably die cast and has its recessed, cylindrical body portion 10 formed with guide arms 11 radially extended from the sides of said body portion to guide winding of electric wire cords on spool 8. A central bore 12 in the recess 13 of body portion 10 permits attaching of spool 8 to baseboard 3 by a screw 14 which simultaneously mounts in the recess of said body portion a U-shaped spring metal clip 15. Spool 8 is encompassed by cup-shaped cover member 9 which is formed with slots 16, 16' in its peripheral wall 17 and includes an axially arranged, inwardly extended finger portion 18 adapted to be gripped by U-shaped spring clip 15 to removably secure cover member 9 to spool 8.

The described reel structure permits quick and easy shortening of electric wire cords when used to electrically connect fixtures with baseboard outlets by winding excessive length of such cords on the spools and covering same with the cover members for protection of the wound up cord portions, all for the purpose of quickly and economically fitting extension cords of standard length to particular jobs and avoiding extension cord connections having excessive, unsightly and dangerous wiring.

Figure 5:
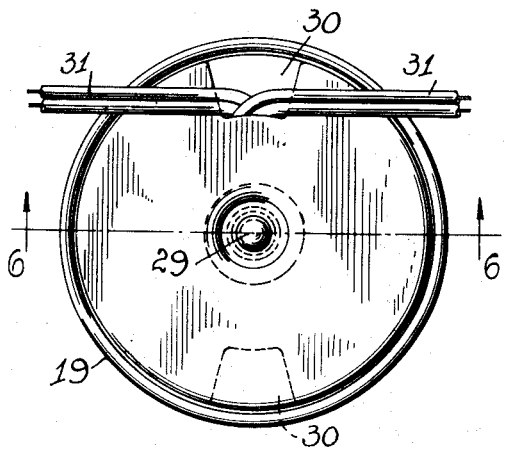
Fig. 5 is a front elevation of a somewhat modified form of a reel structure constructed in accordance with the invention.
Figure 6:
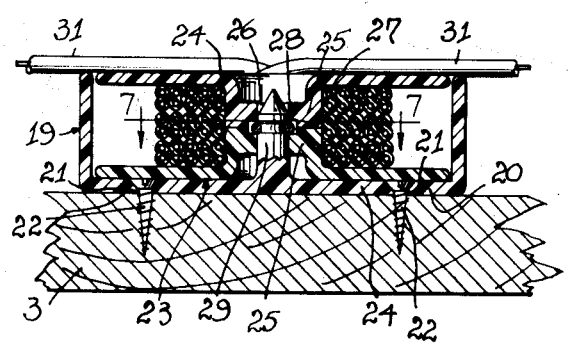
Fig. 6 is a cross-sectional view taken on line 6—6 of Fig. 5.
Figure 7:
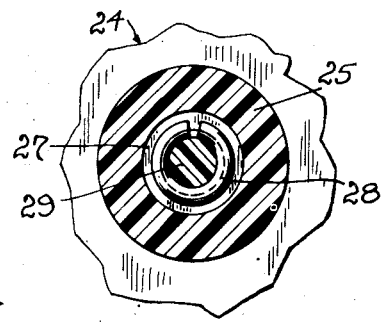
Fig. 7 is a fragmentary sectional view taken on line 7—7 of Fig. 6.

The modified form of wire reel structure shown in Figs. 5 through 7 differentiates from the structure disclosed in Figs. 1 through 4 by including a cup-shaped cover member 19 having its wall 20 bores 21 to permit attaching of the cover member in an inverted position to baseboard 3 by means of screw members 22. This cover member encompasses a spool 23 assembled from identically constructed disk members 24 which include recessed, perforated hub portions 25. Disk members 24 are secured to each other in such a fashion that their hub portions 25 face each other and are axially aligned with each other to provide spool 23 with a recessed bore 26 having in its recess 27 mounted a spring split ring 28 cooperating with a circumferentially recessed, axially arranged finger portion 29 in cover member 19 to removably support spool 23 in cover member 19 in axial alignment with respect thereto. The disk members 24 include cut out portions 30 to permit extension cord 31 to be partly wound on spool 23 when such cord has its opposite ends electrically connected to a fixture and an outlet box all as illustrated in Fig. 1.

Figure 8:
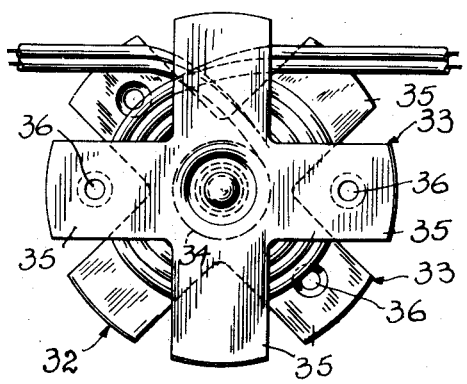
Fig. 8 is a front elevation of another modified form of a reel structure constructed in accordance with the invention.

The modified form of spool 32 shown in Fig. 8 may be used with the cover member 19 disclosed in Figs. 5 through 7, or such spool may be directly attached to a baseboard or wall. In this case the spool is assembled from spider members 33 having hub portions 34, which spiders members have their hub portions opposed and secured to each other in axial alignment with respect to each other and have their opposing spider arms 35 arranged in laterally and angularly offset relation with respect to each other to facilitate attaching of spool 32 to a wall by screws or nails extended through bores 36 in the spider arms.

Figures 9, 10:
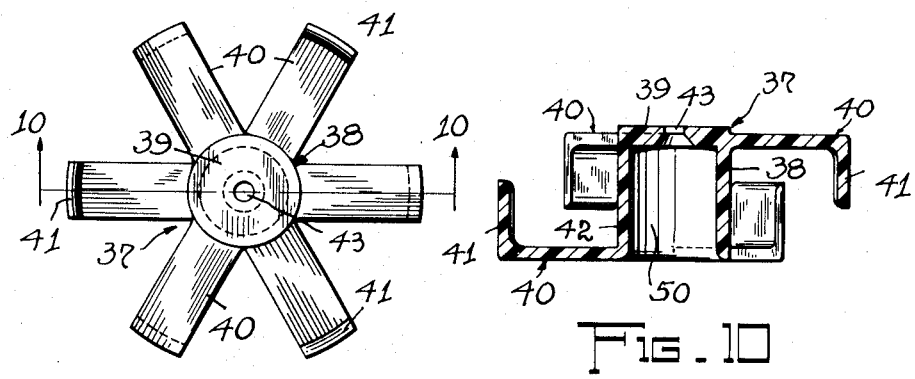
Fig. 9 is a front elevation of still another modified form of a reel structure constructed in accordance with the invention.
Fig. 10 is a sectional view on line 10—10 of Fig. 9.
Figures 11, 12:
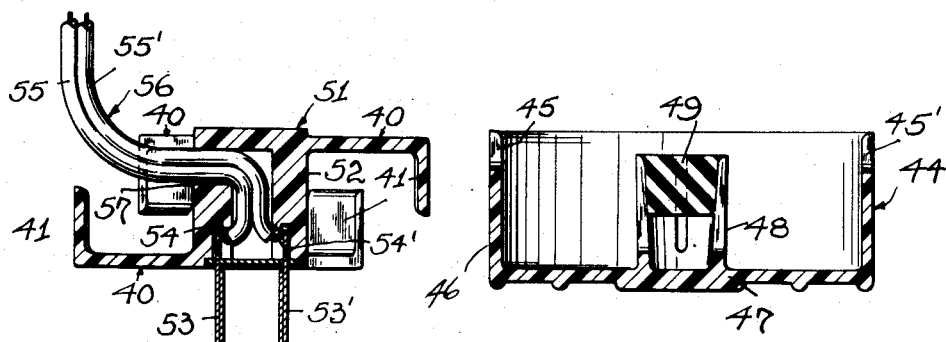
Fig. 11 is a sectional view through a cover member for the reel structure shown in Fig. 9.
Fig. 12 is a sectional view through a reel structure similar to Fig. 10, the structure including plug members and forming the plug end of an electric wire cord adapted to shorten by winding a portion of the chord on the reel structure forming the plug end of such chord.

The modified form of wire reel structure shown in Figs. 9 through 11 discloses a spider-like spool 37 with a chambered cylindrical hub portion 38 closed at one end by a centrally perforated wall 39 and provided with L-shaped spider arms 40 alternately radially extended from the opposite ends of said hub portion. The outer flanges 41 of these spider arms are extended above the peripheral wall 42 of hub portion 38, parallel with respect to such wall, to prevent accidental unwinding of wire cord wound on spool 37, which spool is readily securable to a wall by attachment means cooperating with the perforations 43 in wall 39. The spool 37 is encompassed by a cover member 44 having slots 45, 45' in its peripheral wall 46, which slots are similar to the slots 16, 16' in cover member 9 (see Fig. 4). The cover member 44 has inwardly extended from its wall 47 a slitted, invertedly-cone-shaped, tubular extension 48 which can yieldingly be spread by a shiftable cone-shaped plug 49 so as to effect frictional engagement between extension 48 and inner wall 50 of chambered hub portion 38 when the cover member is sleeved upon spool 37 and tubular extension 48 is extended into chambered hub portion 38.

The modified form of wire reel structure 51 shown in Fig. 12 closely resembles the spider-like spool 37 disclosed in Figs. 9 and 10, with the exception that hub portion 52 mounts two plug members 53, 53' electrically connected with the ends 54, 54' of wires 55, 55', of extension cord 56 which is extended through bore 57 into hub 52. In this case wire reel structure 51 forms the plug end of extension cord 56 which can readily and easily be shortened to any desired length by winding part of cord 56 on wire reel structure 51 attached thereto.

Having thus described my invention what I claim is:

1. A device for shortening electrical wire extension cords embodying a spool having a cylindrical center portion adapted to have a wire cord wound thereon; wire cord retaining, radially arranged arms alternately extended from opposite ends of said center portion in angularly offset relation with respect to each other; and flanges at the ends of said arms arranged to extend opposite to said center portion parallel to the axis thereof to prevent unwinding of electrical cord wound upon the center portion of said spool.

2. A device for shortening electrical wire extension cords including a spider-like spool having a hub portion adapted to have a wire cord wound thereon; a plurality of radial arms extended alternately from opposite ends of said hub portion at right angle to its axis; and flanges at the free ends of said arms extended in spaced relation to the peripheral wall of said hub portion to prevent unwinding of a wire cord wound upon said hub portion.

3. A device for shortening electrical wire extension cords including a spider-like spool having a hub portion and a plurality of L-shaped retaining arms extended alternately from opposite ends of said hub portion at right angles to its axis, the free flanges of said L-shaped arms being extended in laterally spaced relation parallel to the axis of said hub portion.

JOHN E. NEELY.

References Cited in the file of this patent

UNITED STATES PATENTS

| Number | Name | Date |
|---|---|---|
| 775,931 | Ott | Nov. 29, 1904 |
| 1,386,918 | Westrup | Aug. 9, 1921 |
| 1,908,278 | Angell | May 9, 1933 |
| 1,947,517 | Brosilow | Feb. 20, 1934 |
| 2,319,731 | Garrett | May 18, 1943 |
| 2,429,675 | Eypper | Oct. 28, 1947 |
| 2,521,226 | Keller | Sept. 5, 1950 |
| 2,582,787 | Martin | Jan. 15, 1952 |